United States Patent [19]
Suzuki

[11] Patent Number: 5,463,501
[45] Date of Patent: Oct. 31, 1995

[54] OBJECTIVE-LENS DRIVING APPARATUS

[75] Inventor: Hiroyuki Suzuki, Higashihiroshima, Japan

[73] Assignee: Sharp Kabushiki Kaisha, Osaka, Japan

[21] Appl. No.: 336,232

[22] Filed: Nov. 3, 1994

Related U.S. Application Data

[63] Continuation of Ser. No. 969,452, Oct. 30, 1992, abandoned.

[30] Foreign Application Priority Data

Jan. 13, 1992 [JP] Japan .................................. 4-003704
Jun. 2, 1992 [JP] Japan .................................. 4-141459

[51] Int. Cl.⁶ ...................................................... G02B 7/02
[52] U.S. Cl. .......................... 359/814; 359/824; 369/44.15
[58] Field of Search ................................ 359/813, 814, 359/823, 824; 369/44.15–44.17, 44.21

[56] References Cited

U.S. PATENT DOCUMENTS

| | | | |
|---|---|---|---|
| 4,664,476 | 5/1987 | Kasuga | 359/814 |
| 4,766,583 | 8/1988 | Oinooe et al. | 359/814 |
| 4,863,240 | 9/1989 | Nakajima et al. | 359/814 |
| 4,991,161 | 2/1991 | Ikegame et al. | |
| 4,998,802 | 3/1991 | Kasuga et al. | 359/814 |
| 5,018,836 | 5/1991 | Noda et al. | 359/824 |
| 5,073,883 | 12/1991 | Mitsunori | 369/44.15 |
| 5,128,806 | 7/1992 | Ohno | 359/813 |
| 5,191,484 | 3/1993 | Yeon et al. | 358/814 |
| 5,206,762 | 4/1993 | Kashara et al. | 359/814 |

FOREIGN PATENT DOCUMENTS

| | | |
|---|---|---|
| 0440196 | 8/1991 | European Pat. Off. . |
| 60-226031 | 11/1985 | Japan . |
| 62-141646 | 6/1987 | Japan . |
| 63-138536 | 6/1988 | Japan . |
| 158926 | 6/1990 | Japan .................... 359/44.21 |

Primary Examiner—Loha Ben
Attorney, Agent, or Firm—Nixon & Vanderhye

[57] ABSTRACT

In an objective-lens driving device of the present invention, an objective lens holder is supported by a parallel link mechanism so that it is permitted to rock in the focusing direction and in the tracking direction. The parallel link mechanism is provided with hinges that are formed as thinner portions having flexibility. A magnet is secured to the rocking end of the objective lens holder. Iron pieces are symmetrically fixed to cavity sections in tracking coils that are fixed to the base opposite to the magnet. The center of the rocking movement of the objective lens holder, the center of the magnet and the center of the symmetrical arrangement of the iron pieces are disposed on a straight line. In this case, the objective lens fixed to the objective lens holder is in the neutral position. As a result, during non-operating state, the neutral position of the objective lens is maintained by attracting forces that are exerted between the magnet and iron pieces.

23 Claims, 5 Drawing Sheets

OBJECTIVE-LENS DRIVING APPARATUS

This is a continuation of application Ser. No. 07/969,452, filed Oct. 30, 1992, now abandoned.

FIELD OF THE INVENTION

The present invention relates to an objective lens driving device that is installed in an optical pickup for use in optical information recording-reproduction apparatuses.

BACKGROUND OF THE INVENTION

Conventionally, in an optical pickup used for optical information recording-reproduction apparatuses, a light beam is focused onto a recording surface of an optical disk through an objective lens. The objective lens is installed in an objective-lens driving device which is controlled according to a varying amount of a detected light beam reflected from the optical disk so that the light beam is focused onto a target track on the recording surface of the optical disk, and accurately traces the target track.

The objective lens, which is installed in the objective-lens driving device, is driven in two directions: a focusing direction and a tracking direction. The focusing direction is parallel to the light axis, that is, perpendicular to the recording surface of the optical disk, and the tracking direction is orthogonal to the light axis, that is, parallel to the recording surface of the optical disk.

In such an objective-lens driving device, it is necessary to drive the objective lens without causing any tilt between the central axis of the objective lens and the light axis. For this reason, an objective-lens driving-use support body, which supports the objective lens, is provided with a parallel link mechanism that shifts the objective lens in the focusing direction while maintaining its horizontal position by means of joints (hinges) having a partially thinner portion. The support body is further furnished with a hinge section that is made flexible by providing a partially thinner portion at the rotation center thereof with respect to the objective lens, which is rocked in the tracking direction.

In adjusting the optical pickup, the objective lens is attached to the lens holder so that the objective lens is located at an optimum position with respect to the axis of the light beam. After adjusting the mechanism, it is desirable that the axis of the objective lens is kept coincident with the light axis under any environmental conditions of high temperature or low temperature. Although such an actuator, which employs the objective-lens driving-use support body made of resin, has advantages in that it can be efficiently assembled at a low cost, etc., it also has a disadvantage that the axis of the objective lens tends to deviate from the light axis due to temperature changes.

In particular, the hinge section, which is provided with a means to shift the objective lens in the focusing direction and/or the tracking direction, is easily deformed due to high temperatures. When shelf tests are conducted under high temperatures, the hinge section becomes softened and causes the optical pickup to deteriorate in its performance as is described in the following.

When an optical pickup, whose objective lens has been adjusted so as to be located at an appropriate position with respect to the light axis, is left under high temperature, the hinge section provided as a thinner portion softens. As a result, the hinge section is unable to hold the weight of the lens holder, which includes the driving coils and objective lens. This causes the lens holder to be dislocated downward and to come into contact with the base plate of the optical pickup at one portion of the bottom surface thereof. If this state is left untreated, the bottom surface of the lens holder will entirely contact the surface of the base plate.

Here, it is noted that although the positional relationship between the central axis of the objective lens and the light axis has been properly adjusted, the positional relationship between the central axis of the objective lens and the surface of the base plate is not necessarily constant due to errors in the assembling process or other processes. Therefore, in the state where the bottom surface of the lens holder has been kept in contact with the surface of the base plate, if the ambient temperature drops to normal temperature or low temperature, the lens holder is raised to its original state as the hinge section recovers its original modulus of elasticity; however, in fact, the lens holder will return to a somewhat different state from the original adjusted state seen before it underwent the high temperature shelf test. This change in position results in serious adverse effects on the optical performance; therefore, it has been desired to minimize the change of positional movement. Further, in the case where an optical information recording-reproduction apparatus is used in such a manner as to cause a tilt on the objective-lens driving device installed therein, it is hard to maintain the proper position of the objective lens with respect to the tracking direction due to the weight of the lens holder.

By adopting the conventional methods such as the fulcrum axis method using metal materials and the parallel arm method using plate springs and flexible wires, the above problems can be reduced; however, those methods arise other problems of scratches and dust associated with their sliding-axis mechanism, and are not effective in the working efficiency of the assembly.

In an objective-lens driving device taught in the Japanese Laid-Open Patent Publication No. 138536/1988 (Tokukaishou 63-138536), a mold-type resin support body wherein a tracking-use hinge is formed is adopted. Here, at least two iron pieces are symmetrically disposed in a plane that is perpendicular to a line connecting between the objective lens and the tracking-use hinge and that passes through the center of the tracking-use hinge. During non-driving state, the neutral position of the objective lens with respect to the tracking direction is achieved by attracting forces of magnets that are exerted between the corresponding iron pieces.

The operation of the above-mentioned objective-lens driving device can be theoretically fulfilled if those magnets disposed symmetrically have a completely uniform magnetic flux density and the distance between each magnet and the corresponding iron piece is completely constant. In actual practice, however, even the slightest error in the magnetic flux density or in the distance may cause a slight difference in the attracting force of the magnet that is exerted on the corresponding iron piece. As a result, the objective lens is always pulled toward either of the magnets that has a stronger attracting force. When a high-temperature test is conducted on an objective-lens driving device of this type, the error in the magnetic flux density of the magnets and the error in the distance between the magnet and the iron piece are increased to the extreme due to the softened molded-type resin support body, thereby causing the position of the objective lens to be dislocated. Further, since the frequency characteristic of the objective-lens driving device is changed due to the dislocation of the position of the tracking-use hinge, problems such as resonance may be encountered. Therefore, it is doubtful whether the above-mentioned objective-lens driving device can be put into practical use.

On the other hand, in an objective-lens driving device taught in the Japanese Laid-Open Patent Publication No. 226031/1985 (Tokukaishou 60-226031), the neutral position of the objective lens is achieved by two plate springs that are aligned opposite to each other in the focusing direction. Here, an attracting force, which is exerted between a magnet secured to the rocking end of the objective lens holder and a magnetic material aligned face to face with the magnet, is used to assist in the dislocation of the plate springs in the focusing direction.

However, even a slightest twisting force applied onto the plate springs may be amplified by the attracting force between the magnet and the magnetic material; hence, it is doubtful whether this objective-lens driving device can be put into practical use.

As described above, in the conventional objective-lens driving devices, the objective-lens driving-use support body including such a mechanism as the parallel link mechanism that is made of resin has advantages in working efficiency of assembly and low cost; however, it may cause adverse effects on the optical performance of the optical pickup because the parallel link mechanism or other mechanism may be deformed due to high temperatures.

Moreover, in the objective-lens driving device which suffers from lack of balance in the tracking direction around the tracking-use hinge as its center, if the optical information recording-reproduction apparatus is used with its optical pickup being tilted, especially in the case where it is tilted in such a manner that the tracking direction coincides with the vertical direction, the objective lens is not maintained in the neutral position due to the weight of the lens holder.

Furthermore, in the structure wherein two pairs of the magnet and the iron pieces are disposed at respective places, which are symmetrical with the tracking-use hinge as the center, in order to prevent the lens holder from being dislocated downward, tilt of the objective lens due to fluctuations of the attracting force presents a problem to be solved.

SUMMARY OF THE INVENTION

It is an object of the present invention to provide an objective-lens driving device utilizing a parallel link mechanism made of resin, which can hold the objective lens in a neutral position during the non-operating state, and drive the objective lens based on the neutral position as a reference point during the operating state, independent of ambient temperature changes or tilt of a host apparatus.

In order to achieve the above objective, the objective-lens driving device of the present invention is characterized by having at least the following means:

(1) holding means (for example, objective lens holder) for holding an objective lens;

(2) supporting means (for example, a parallel link mechanism that is integrally molded of resin together with thin hinges) having a fixing end and a rocking end situated opposite to the fixing end, the supporting means being arranged to support the holding means that is connected to the rocking end, the fixing end being fixed to a base of the objective-lens driving device.

(3) magnet means (for example, a rectangular solid magnet) for generating a constant magnetic field, the magnet means having a single body and being fixed to the holding means;

(4) coil means (for example, a focusing coil and a tracking coil), for generating a controlling magnetic field by which the holding means is driven in the focusing direction and in the tracking direction by the interaction of the magnet means, the coil means being fixed to the base so as to be aligned face to face with the magnet means; and (5) magnetic bodies (for example, a plurality of iron pieces) for inducing an attracting force through an interaction with the magnet means in such a manner that the objective lens is held in the neutral position during a non-driving state at which the intensity of the controlling magnetic field equals "0", the magnetic bodies being fixed to the base so as to be disposed face to face with the magnet means, the center of the magnetic bodies being placed on a center line passing through the center of the rocking movement of the rocking end and the center of the magnet means.

In the case where the magnet means is fixed to the rocking end of the holding means, the coil means and magnetic bodies are fixed to the base of the objective-lens driving device. On the other hand, in the case where the magnet means is fixed to the base, the coil means and the magnetic bodies are fixed to the rocking end of the holding means.

Further, the magnet means is provided with a surface having a virtually rectangular shape with its longer sides disposed in a direction perpendicular to both the above-mentioned center line and the focusing direction.

Here, in the case where the magnetic bodies are constituted of a plurality of iron pieces, the center of the magnetic bodies refers to the center of a symmetrical arrangement of the iron pieces with respect to the above-mentioned center line.

With the above arrangement, an attracting force is induced between the magnet means and the magnetic bodies in such a manner that the center of the rocking movement of the support means, the center of the magnet means, and the center of the magnetic bodies are aligned in a straight line. When the center of the rocking movement of the support means, the center of the magnet means and the center of the magnetic bodies are aligned on the straight line, the objective lens will be located at the neutral position. Therefore, during the non-driving state at which no controlling magnetic field is generated by the coil means, the objective lens is always held at the neutral position.

As a result, the neutral position of the objective lens is maintained independent of ambient temperature changes or tilt of the host apparatus provided therein with the objective-lens driving device; thus, it is possible to avoid a deviation between the central axis of the objective lens and the light axis passing through the center of the objective lens.

Moreover, the magnet means, which is made of a single body, or more specifically a single magnet, can produce a constant magnetic field; therefore, it is possible to avoid fluctuations in the attracting force between the magnet means and the magnetic bodies that are caused by the adverse effect of the magnet means. Even though the magnetic bodies are constituted by a plurality of iron pieces, these advantages are achieved as long as the iron pieces are disposed symmetrically with respect to the above-mentioned center line and further, as long as the magnet means has a virtually rectangular surface that is located face to face with the iron pieces.

For a fuller understanding of the nature and advantages of the invention, reference should be made to the ensuing detailed description taken in conjunction with the accompanying drawings.

DESCRIPTION OF THE EMBODIMENTS

EMBODIMENT 1

Figure 1:
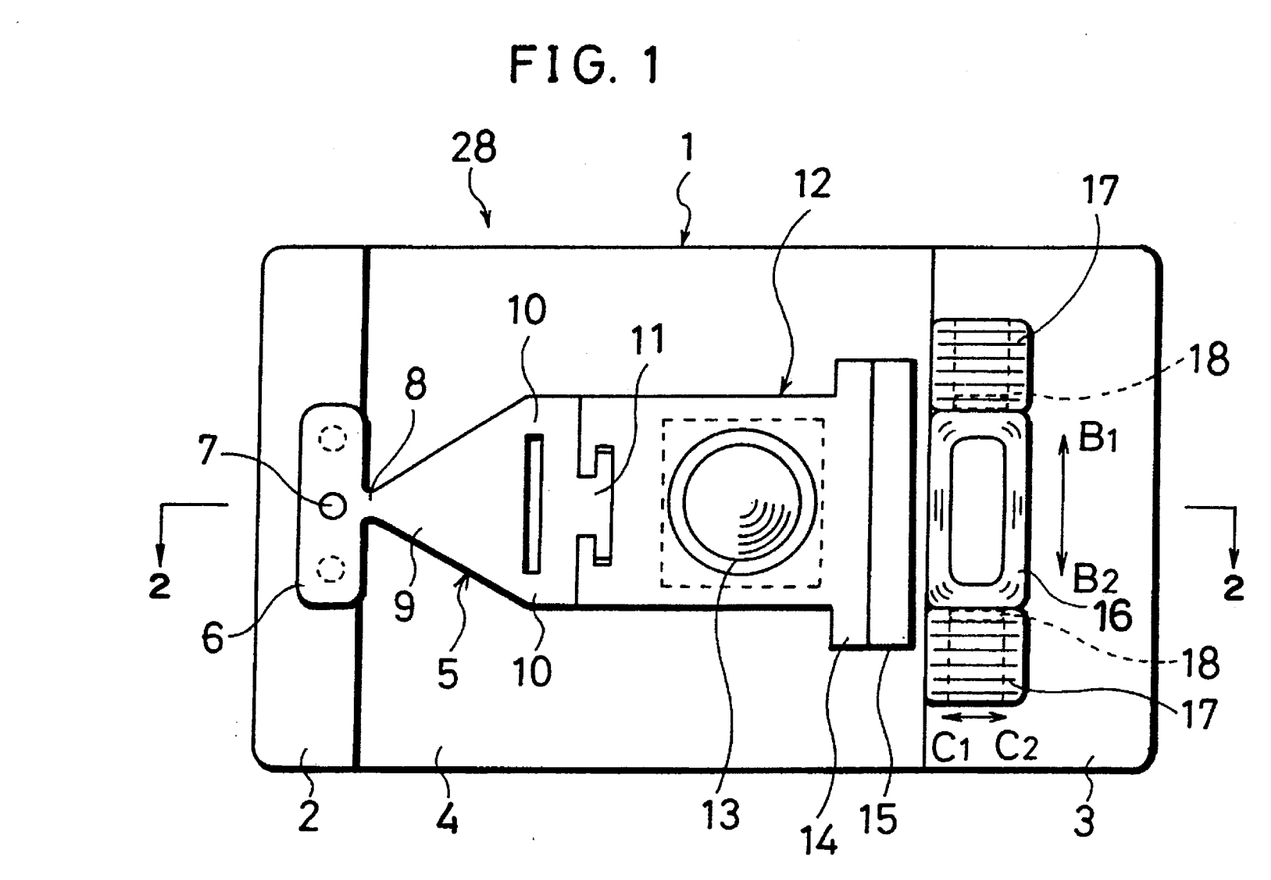
FIG. 1 is a plan view showing one embodiment of an objective-lens driving device of the present invention.
Figure 2:
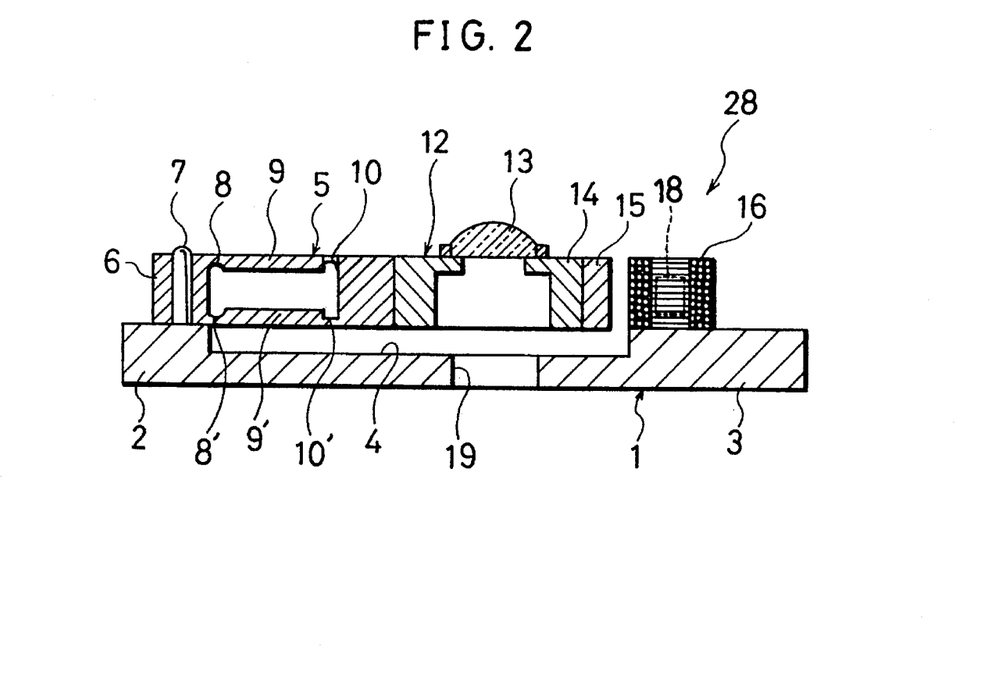
FIG. 2 is a vertical sectional view taken on the line A—A of FIG. 1
Figure 3:
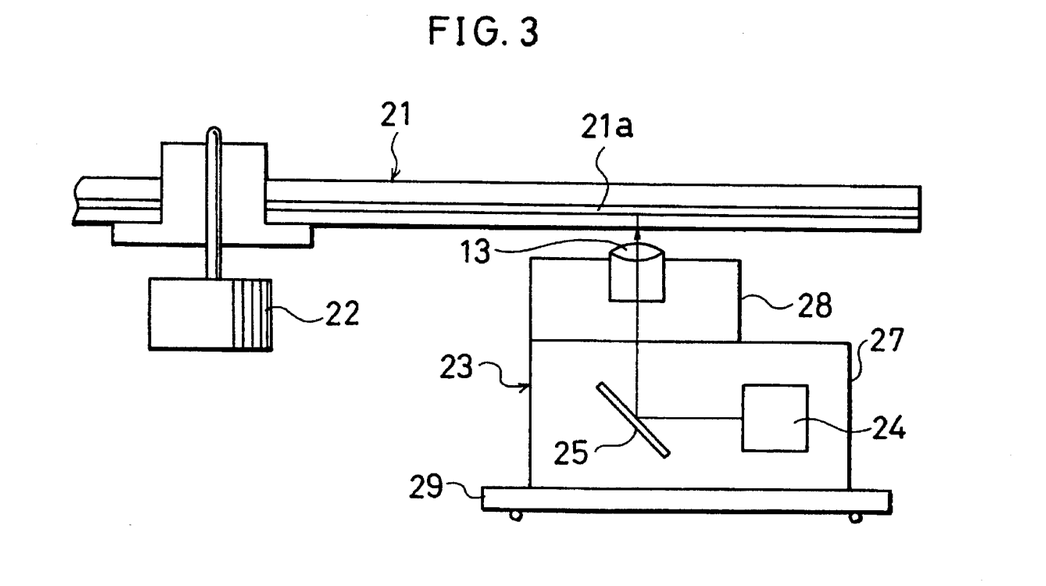
FIG. 3 is a schematic side view showing a structure of an optical information recording-reproduction apparatus provided with the objective-lens driving device.

Referring to FIGS. 1 through 3, the following description will discuss one embodiment of an objective-lens driving device of the present invention.

First, an explanation will be briefly given on an optical information recording-reproduction apparatus provided with the objective-lens driving device of the present invention. As illustrated in FIG. 3, the optical information recording-reproduction apparatus has a motor 22 for rotatively driving an optical disk 21 and an optical pickup 23 for projecting a light beam onto the optical disk 21 as well as for receiving light reflected off from the optical disk 21.

The optical pickup 23 has a laser light source 24, a polarizing mirror 25 and an objective lens 13. The laser light source 24 and the polarizing mirror 25 are installed in a housing 27, while the objective lens 13 is held by an objective-lens driving device 28 on the housing 27 in such a manner that it is disposed in the light beam path between the polarizing mirror 25 and the optical disk 21. The optical pickup 23 is moved in a tracking direction by a moving mechanism 29 having a driving means such as a linear motor. Here, the tracking direction is defined as a direction that is parallel to the recording surface 21a of the optical disk 21 and orthogonal to tracks.

Next, referring to FIGS. 1 and 2, the following will describe the objective-lens driving device 28. The objective-lens driving device 28 has a base 1 having a virtually rectangular shape, which constitutes one part of the housing 27. Step portions 2 and 3 are formed on both sides of the base 1. Thus, the upper surface of the step portions 2 and 3 has a level higher than the upper surface of the flat portion 4 that is formed between the step portions 2 and 3. This structure allows the objective lens 13 to be dislocated away from the optical disk 21 in the focusing direction.

There is an aperture 19 formed at a position closer to the step portion 3 from the center of the flat portion 4, through which a laser beam emitted from the laser light source 24 is passed. Further, an objective-lens driving-use support body 5 (hereinafter, referred to as "support body") provided with a parallel link mechanism is secured onto the step portion 2, for example, by press-fitting a pin 7 into a fixing section 6 of the support body 5 and by the use of adhesive. The height of the fixing section 6 is virtually equal to the thickness of an objective lens holder 12, which will be described later.

The support body 5 is mainly constituted by a pair of link sections 9 and 9' that are vertically aligned opposite to each other and an objective lens holder fixing section 11 (hereinafter, referred to as "holder fixing section") that has the same width and thickness as those of the objective lens holder 12. The link sections 9 and 9' are plates in the shape of an isosceles triangle, and their apexes are respectively supported by the upper and lower center portions of the fixing section 6 through hinges 8 and 8'. Further, two bottom corners of the link section 9 are connected to both ends of the upper portion of the holder fixing section 11 through hinges 10. On the other hand, two bottom corners of the link section 9' are connected to both ends of the lower portion of the holder fixing section 11 through hinges 10'.

The hinges 8 and 8' as well as 10 and 10' are formed as thinner portions such that they have flexibility. The flexibility of the hinges 8 and 8' enables the support body 5 and the objective lens holder 12 to rock in the tracking direction and in the focusing direction that is orthogonal to the tracking direction. Further, the flexibility of the hinges 10 and 10' enables the holder fixing section 11 and the objective lens holder 12 to rock in the focusing direction.

Here, the fixing section 6, the hinges 8 and 8', the link sections 9 and 9', the hinges 10 and 10', and the holder fixing section 11 are integrally made up of synthetic resin.

The objective lens holder 12 is connected to the holder fixing section 11 by fitting the recessed portion formed in the objective lens holder 12 on the projecting portion formed on the holder fixing section 11. The objective lens 13 is fixed at the center of the upper surface of the objective lens holder 12 by adhesive bonding.

Thus, by the rocking movements of the support body 5 in the two directions around the intermediate point of the hinges 8 and 8' as the center and the rocking movement of the objective lens holder 12 in the focusing direction around the intermediate points of the hinges 10 and 10' as the center, the objective lens 13 is freely rocked in the focusing direction that is parallel to the light axis passing through the center thereof and in the tracking direction that is included in a plane perpendicular to the light axis.

The objective lens holder 12 is provided with a magnet 15 at a rocking end 14 thereof opposite to the support body 5. For example, the magnet 15 is a rectangular bar having a rectangular shape in its cross section, which has a width slightly wider than that of the holder fixing section 11.

A focusing coil 16 is fixed on the upper surface of the step portion 3 by adhesive bonding in such a manner that it is disposed face to face with the magnet 15 having a slight space therebetween and that the coil axis thereof is parallel to the focusing direction. In this case, assuming a hypothetical center line that passes through the centers of the hinge 8 and the objective lens 13 in FIG. 1, it is desired that the center of the focusing coil 16 is situated on this hypothetical center line.

On the other hand, on both sides of the focusing coil 16, tracking coils 17 are fixed by adhesive bonding in such a manner that the tracking coils 17 do not overlap the focusing coil 16 and that the common coil axis of the tracking coils 17 are perpendicular to the coil axis of the focusing coil 16.

When an electric current is supplied to the focusing coil 16 in direction $B_1$ or $B_2$ or when an electric current is supplied to the tracking coils 17 in direction $C_1$ or $C_2$, the magnet 15 is subjected to an electromagnetic force which is exerted to rock it in the focusing direction or in the tracking direction according to Fleming's left-hand rule.

Iron pieces 18 are secured to cavity sections around the coil axes of the respective tracking coils 17 by adhesive bonding so that they are symmetrically situated with respect to the above-mentioned hypothetical center line.

Figure 4:
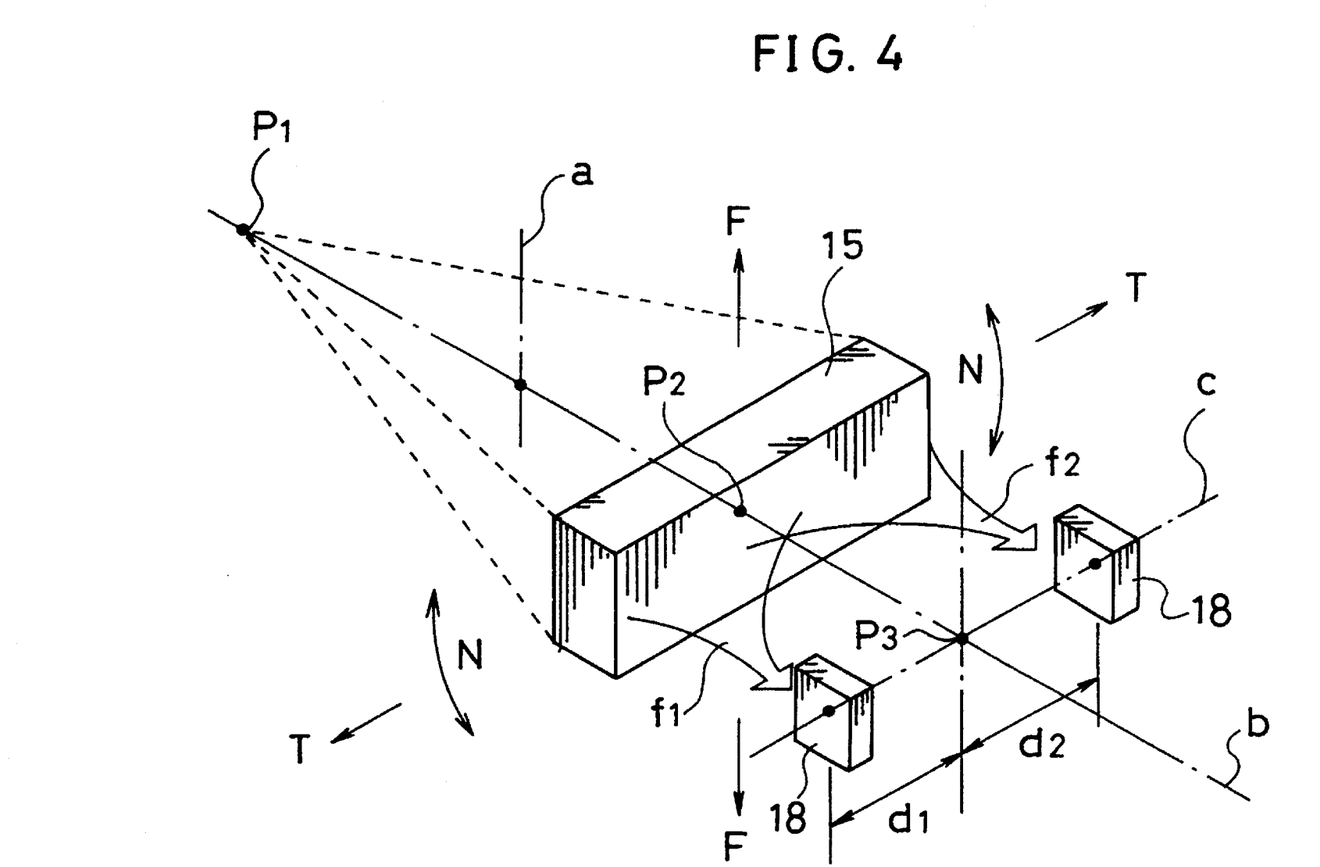
FIG. 4 is a schematic illustration showing a positional relationship between a magnet and iron pieces in the objective-lens driving device.

Referring to FIG. 4, the following description will discuss the arrangement of the iron pieces 18 more specifically. In FIG. 4, point $P_1$ is an intermediate point between a pair of the upper and lower hinges 8 and 8', which forms a center of the rocking movements of the support body 5. Point $P_2$ is the center of the magnet 15. Point $P_3$, which is situated on a straight line c connecting the centers of the iron pieces 18, is the middle point having the same distance from the centers of the iron pieces 18 ($d_1=d_2$). In this case, the point $P_3$ is located on a center line b passing through the point $P_1$ and the point $P_2$; thus, the point $P_1$, the point $P_2$ and the point $P_3$ are aligned in this order. Moreover, the straight line c passing through the centers of the iron pieces 18 is orthogonal to the center line b and is located within a plane that is perpendicular to a light axis a passing through the objective lens 13.

In this embodiment, the shape of the magnet 15 is a rectangular solid, and the shape of the surface opposite to the iron pieces 18, that is, the surface perpendicular to the center line b, is a rectangle whose longer sides are parallel to the straight line c. However, the present invention is not limited to this arrangement, and the magnet 15 may have another solid form as long as the longer sides of its surface opposite to the iron pieces 18 are parallel to the straight line c.

In the above arrangement, during the non-driving state wherein no controlling electric current is supplied to the focusing coil 16 or to the tracking coils 17, the total weight of the support body 5, the objective lens holder 12, the objective lens 13 and the magnet 15 is supported by strong attracting forces that are exerted between the magnet 15 and the iron pieces 18. In other words, the support body 5, the objective lens holder 12, the objective lens 13 and the magnet 15 are brought into a state as if they were hung down from the fixing section 6 toward the iron pieces 18. Therefore, in FIG. 4, all the points $P_1$, $P_2$ and $P_3$ are aligned on the center line b; this allows the objective lens 13 to be located in a neutral position with respect to the tracking direction (indicated by arrow T in FIG. 4) and the focusing direction (indicated by arrow F in FIG. 4).

Further, the iron pieces 18 are disposed in the direction of the straight line c apart from each other so that they are symmetrical with respect to the center line b; therefore, an attracting force (indicated by arrow $f_1$ in FIG. 4) exerted between one iron piece 18 and the magnet 15 is equal to that (indicated by arrow $f_2$ in FIG. 4) exerted between the other iron piece 18 and the magnet 15. More specifically, each component of the attracting force $f_1$ is equal to each component of the attracting force $f_2$ with respect to the tracking direction T or the focusing direction F. Therefore, it is possible to prevent the magnet 15 from undergoing a rotating force around the center line b, that is, from a twist indicated by arrow N in FIG. 4; thus, the longer sides of the magnet 15 are maintained parallel to the straight line c.

As a result of this arrangement, during the initial state, the objective lens 13 having the central axis that is coincident with the light axis a is normally maintained in the neutral position with respect to the focusing direction F and the tracking direction T as well as the direction of the twist N.

Additionally, during the driving state wherein a controlling electric current is supplied to the focusing coil 16 and the tracking coils 17, the objective lens 13 is driven in the focusing direction F and the tracking direction T based on the neutral position as a reference point.

Here, as to the number of the iron pieces 18 to be installed, it is not necessarily limited to two pieces aligned opposite to each other as described above; any number of them may be installed as long as they are symmetrical with respect to the center line b.

With the function as described above, for example, during a high temperature shelf test, even in the case where the hinges 8 and 8' as well as 10 and 10', which are thinner portions of the support body 5, become softened due to the high temperature such that they become too weak to support the weight of the objective lens holder 12, the objective lens 13 and other members, the objective-lens driving device of the present invention operates to maintain the neutral position by the use of attracting forces between the magnet 15 and the iron pieces 18. Further, even in the case where the optical pickup 23 is tilted, it is also possible to avoid the dislocation of the objective lens 13, thereby maintaining the correct neutral position.

Figure 6:
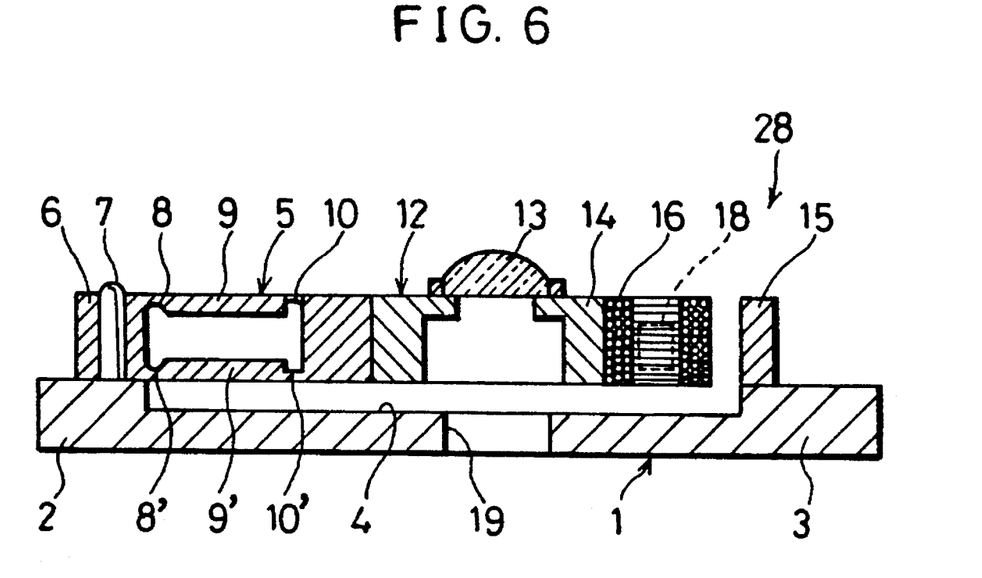
FIG. 6 is a vertical sectional view similar to that in FIG. 2 showing another embodiment of the present invention.

Additionally and as illustrated in FIG. 6, the application of the present invention is possible and the same function can be obtained by an arrangement wherein the positional relationship between the coils 16 and 17 and the magnet 15 is reversed from the present embodiment in such a manner that the iron pieces 18 are installed on the objective lens holder 12.

EMBODIMENT 2

Figure 5:
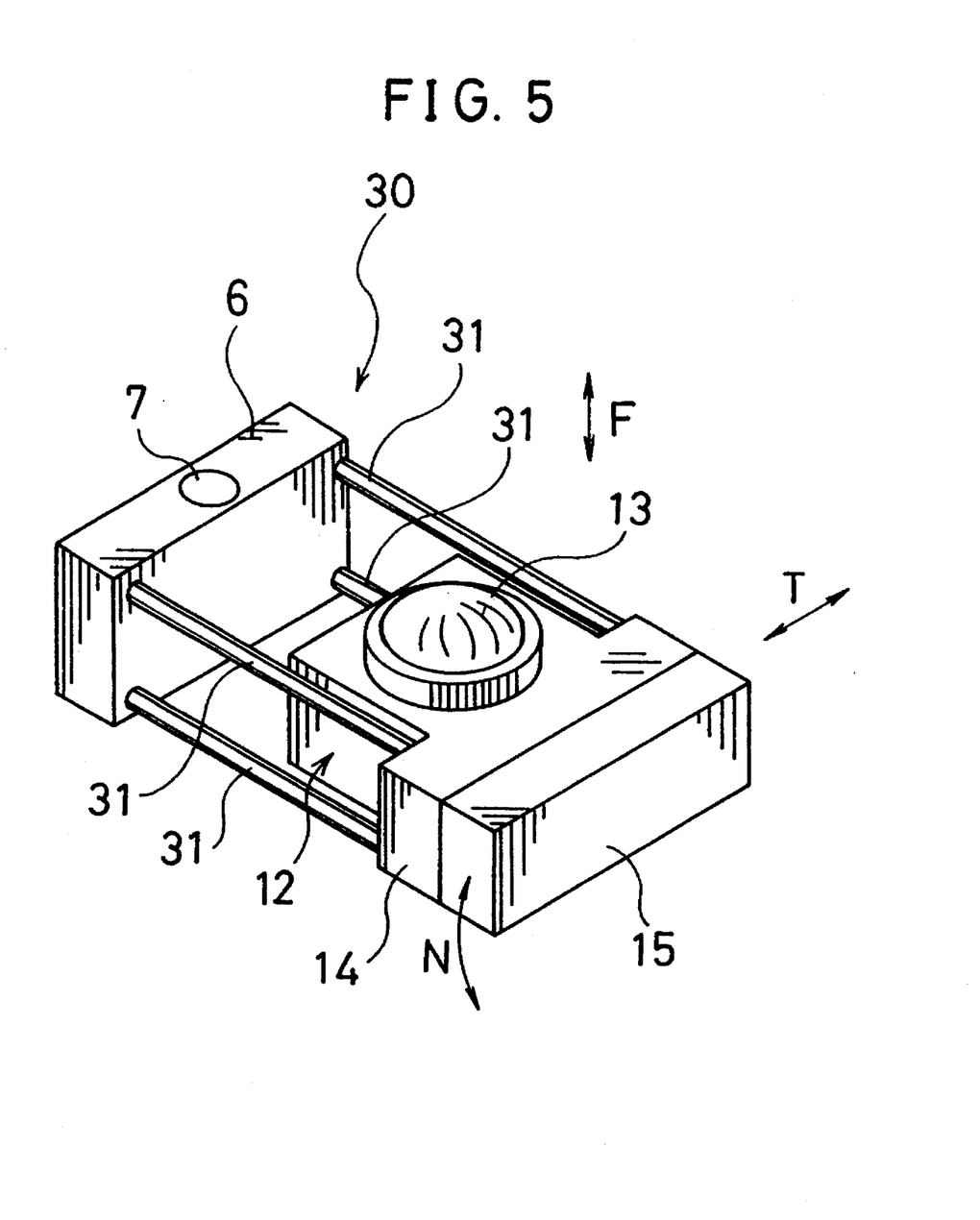
FIG. 5 is a perspective view showing another embodiment of the objective-lens driving device of the present invention.

Next, referring to FIG. 5, the following description will discuss another embodiment of the present invention. Here, for convenience of explanation, those members that have the same functions and have been described in the first embodiment are indicated by the same reference numerals and the description thereof is omitted.

In the embodiment 1, by the use of the support body 5 that is provided at both ends of the link sections 9 and 9' with the hinges 8 and 8' as well as 10 and 10' having flexibility, the objective lens holder 12 is rocked in the focusing direction F and the tracking direction T. On the other hand, in the present embodiment, a support body adopting the four-wire system is employed. In FIG. 5, the base, the coils and other members that have the same structure as the embodiment 1 are omitted; only the support body 30 adopting the four-wire system, the objective lens 13, the objective lens holder 12 and the magnet 15 are shown.

As illustrated in FIG. 5, the support body 30 is provided with a fixing section 6, which is fixed to the base by press-fitting a pin 7 and by adhesive bonding, and four mutually parallel wires 31 that connect the fixing section 6 and the objective lens holder 12. The wires 31, which are made of, for example, elastic metal or other material, is fixed to the fixing section 6 at one end and to the objective lens holder 12 at the other end, through respective dampers, not shown. The four wires 31 are orthogonal to the light axis passing through the objective lens 13 and are disposed symmetrically with respect to a straight line passing through the center of the magnet 15.

Here, for example, metal wires coated with flexible damping material may be employed as the wires 31. Moreover, any elastic rod can be used as the wires 31; therefore, it is possible to employ a support body 30 which is integrally made up of synthetic resin together with four rods and a fixing section 6.

Thus, by coupling the objective lens holder 12 to the fixing section 6 using the four wires 31, the objective lens 13 which is fixed to the objective lens holder 12 is permitted to rock in the focusing direction F and in the tracking direction T in the same manner as the embodiment 1.

Further, in the objective-lens driving device of the present embodiment, as with the embodiment 1, the magnet 15 is secured to the rocking end 14 of the objective lens holder 12 and iron pieces to be attracted by the magnet 15, not shown, are installed on the base in such a manner that the objective lens 13 is placed at the neutral position during the non-driving state. With this arrangement, even if the dampers that are used for fixing the wires 31 to the objective lens holder 12 and to the fixing section 6 undergo deterioration with age, the attracting forces exerted between the magnet 15 and the iron pieces can maintain the objective lens 13 at the neutral position with respect to the focusing direction F and the tracking direction T as well as the direction of the twist N, during the initial state wherein no electric current is supplied to the coils. Additionally, the present invention may be applied to, for example, an objective-lens driving device wherein a support body using the plate-spring system is employed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An objective-lens driving device comprising:

holding means for holding an objective lens having an optical axis through a center of the lens;

supporting means having a fixing end and a rocking end situated opposite to the fixing end, the supporting means being arranged to support the holding means that is connected to the rocking end, the fixing end being fixed to a base of the objective-lens driving device;

a magnet, for generating a constant magnetic field and being fixed to the holding means;

coil means for generating a controlling magnetic field by which the holding means is driven in a focusing direction along the optical axis and in a tracking direction perpendicular to the optical axis by an interaction with the magnet, the coil means being fixed to the base and aligned with the magnet; and magnetic means installed with the coil means and disposed near the magnet for generating an interactive magnet force that attracts the magnetic means in a single direction along a center line passing through the optical axis and a center of the magnet, the magnet holding the objective lens in a stable, neutral position when the controlling magnetic field is substantially absent, wherein the magnetic means is disposed symmetrically with respect to said center line.

2. The objective-lens driving device as set forth in claim 1, wherein the magnetic means includes iron pieces symmetrically disposed with respect to the center line and the magnet includes a surface disposed face to face with the iron pieces, the surface having a substantially rectangular shape with longer sides of the surface being parallel to a straight line passing through respective centers of the iron pieces.

3. The objective-lens driving device as set forth in claim 1, wherein the supporting means is integrally made of synthetic resin and includes a first hinge section and a second hinge section, the first hinge section being flexible in the focusing direction, the second hinge section being flexible in the tracking direction.

4. The objective-lens driving device as set forth in claim 3, wherein the supporting means further comprises two plate-shaped link sections in the form of an isosceles triangle that are disposed opposite to each other in the focusing direction, the first hinge section comprises two first hinges, and the second hinge section comprises two pairs of second hinges, each first hinge being coupled to an apex of each link section, each pair of second hinges being coupled to bottom corners of each link section.

5. The objective-lens driving device as set forth in claim 4, wherein the supporting means further comprises a fixing section secured onto the base, whereto the first hinge section is fixed, and the second hinge section is fixed to the rocking end with the first hinge section, the link sections, the second hinge section and the rocking end being formed as an integral unit.

6. The objective-lens driving device as set forth in claim 4, wherein a center of the rocking movement is a middle point between the first hinges of the two link sections.

7. The objective-lens driving device as set forth in claim 1, wherein the coil means comprises a focusing coil for driving the holding means in the focusing direction, the focusing coil having a coil axis that is parallel to the focusing direction and a center that is situated on the center line in the neutral position.

8. The objective-lens driving device as set forth in claim 7, wherein the coil means further comprises tracking coils for driving the holding means in the tracking direction, the tracking coils being disposed on both sides of the focusing coil without overlapping the focusing coil, the tracking coils having a common coil axis that is perpendicular to the coil axis of the focusing coil.

9. The objective-lens driving device as set forth in claim 8, wherein the magnetic means comprises iron pieces that are installed in cavity sections of the tracking coils in a symmetrical arrangement with respect to the center line.

10. The objective-lens driving device as set forth in claim 1, wherein the supporting means comprises four elastic rods that are symmetrically disposed with respect to the center line.

11. The objective-lens driving device as set forth in claim 10, wherein the supporting means further comprises a fixing section secured to the base, the fixing section and the rods being integrally made of synthetic resin.

12. The objective-lens driving device as set forth in claim 1, wherein the base comprises:

a first step portion whereon the fixing end of the supporting means is fixed;

a second step portion whereon the coil means is fixed; and a flat portion that is formed between the first step portion and the second step portion, the flat portion having an upper surface lower than those of the first step portion and the second step portion.

13. An objective-lens driving device comprising:

holding means for holding an objective lens having an optical axis through a center of the lens;

supporting means having a fixing end and a rocking end situated opposite to the fixing end, the supporting means being arranged to support the holding means that is connected to the rocking end, the fixing end being fixed to a base of the objective-lens driving device;

a magnet for generating a constant magnetic field and fixed to the base;

coil means for generating a controlling magnetic field by which the holding means is driven in a focusing direction along the optical axis and in a tracking direction perpendicular to the optical axis by an interaction with the magnet, the coil means being fixed to the holding means and aligned face to face with the magnet; and magnetic means installed with the coil means and disposed near the magnet for generating an interactive magnetic force that attracts the magnetic means in a single direction parallel to a center line passing through the optical axis and a center of the magnet, the magnet holding the objective lens in a stable, neutral position when the controlling magnetic field is substantially absent, wherein the magnetic means is disposed symmetrically with respect to said center line.

14. The objective-lens driving device as set forth in claim 13, wherein the magnetic means includes iron pieces symmetrically disposed with respect to the center line and the magnet includes a surface disposed face to face with the iron pieces, the surface having a substantially rectangular shape with longer sides of the surface being parallel to a straight line passing through respective centers of the iron pieces.

15. The objective-lens driving device as set forth in claim 13, wherein the supporting means is integrally made of synthetic resin and includes a first hinge section and a second hinge section, the first hinge section being flexible in the focusing direction, the second hinge section being formed as a thinner portion so as to be flexible in the tracking direction.

16. The objective-lens driving device as set forth in claim 15, wherein the supporting means further comprises two plate-shaped link sections in the form of an isosceles triangle that are disposed opposite to each other in the focusing direction, the first hinge section comprises two first hinges, and the second hinge section comprises two pairs of second hinges, each first hinge being coupled to an apex of each link section, each pair of second hinges being coupled to bottom corners of each link section.

17. The objective-lens driving device as set forth in claim 16, wherein the supporting means further comprises a fixing section secured onto the base, whereto the first hinge section is fixed, and the second hinge section is fixed to the rocking end with the first hinge section, the link sections, the second hinge section and the rocking end being formed as an integral unit.

18. The objective-lens driving device as set forth in claim 16, wherein a center of the rocking movement is a middle point between the first hinges of the two link sections.

19. The objective-lens driving device as set forth in claim 13, wherein the supporting means comprises four elastic rods that are symmetrically disposed with respect to the center line.

20. The objective-lens driving device as set forth in claim 19, wherein the supporting means further comprises a fixing section secured to the base, the fixing section and the rods being integrally made of synthetic resin.

21. The objective-lens driving device as set forth in claim 13, wherein the base comprises:

a first step portion whereon the fixing end of the supporting means fixed;

a second step portion whereon the coil means is fixed; and a flat portion that is formed between the first step portion and the second step portion, the flat portion having an upper surface lower than those of the first step portion and the second step portion.

22. An objective lens driving device comprising:

a lens holder for holding an objective lens having an optical axis through a center of the lens;

a support having a fixing end and a rocking end situated opposite to the fixing end, the support being arranged to support the lens holder that is connected to the rocking end, the fixing end being fixed to a base of the objective-lens driving device;

a magnet for generating a constant magnetic field, the magnet having a single body and being fixed to one of the lens holder and the base, the objective lens being provided between the magnet and the support;

coil means for generating a controlling magnetic field by which the lens holder is driven in a focusing direction along the optical axis and in a tracking direction perpendicular to the optical axis by an interaction with the magnet, the coil means being disposed face to face with the magnet; and magnetic means installed together with the coil means in one of the lens holder and the base symmetric with respect to a plane which includes a center of the magnet and which passes through the optical axis of the objective lens, wherein the objective lens is held in a neutral position when the controlling magnetic field substantially equals "0" by an attractive force such that the magnet attracts the magnetic means in a single direction parallel to said plane.

23. Apparatus comprising:

a lens holder for holding a lens having an optical axis through a center of the lens;

a base;

a support connected to the base at a first end for supporting the lens holder connected to a second end of the support opposite the first end;

a magnet connected to one of the base and the lens holder;

coil means disposed opposite the magnet on the other of the base and lens holder for generating in conjunction with the magnet a controlling magnetic field that moves the lens holder in a first direction along the optical axis and in a second direction perpendicular to the optical axis; and magnetic means installed with the coil means, wherein the support, the lens, the magnet and the coil means are all arranged along a same line.

* * * * *